(12) United States Patent
Rastogi et al.

(10) Patent No.: US 12,665,493 B2
(45) Date of Patent: Jun. 23, 2026

(54) REAL-TIME VECTOR-BASED OPEN-CIRCUIT FAULT DIAGNOSIS SCHEME FOR THREE-PHASE DUAL ACTIVE BRIDGE CONVERTER

(71) Applicant: North Carolina State University, Raleigh, NC (US)

(72) Inventors: Sagar Kumar Rastogi, Raleigh, NC (US); Subhashish Bhattacharya, Raleigh, NC (US); Suyash Sushilkumar Shah, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 278 days.

(21) Appl. No.: 18/529,681

(22) Filed: Dec. 5, 2023

(65) Prior Publication Data

US 2024/0186888 A1 Jun. 6, 2024

Related U.S. Application Data

(60) Provisional application No. 63/430,161, filed on Dec. 5, 2022.

(51) Int. Cl.
H02M 1/32 (2007.01)
H02M 3/335 (2006.01)

(52) U.S. Cl.
CPC ......... H02M 1/325 (2021.05); H02M 3/3353 (2013.01); H02M 1/32 (2013.01)

(58) Field of Classification Search
CPC ................................ H02M 1/32; H02M 1/325
See application file for complete search history.

(56) References Cited

U.S. PATENT DOCUMENTS 8,169,179 B2 * 5/2012 Mohan .............. H02M 7/53873
318/722
11,870,358 B2 1/2024 Rastogi et al.
(Continued)

OTHER PUBLICATIONS

L. Piris-Botalla, C. Falco, G. Garcia, A. Airabella, and G. Oggier, "Semiconductors faults analysis in dual active bridge dc-dc converter," IET Power Electronics, vol. 9, Jan. 2016.
(Continued)

*Primary Examiner* — Gary A Nash
(74) *Attorney, Agent, or Firm* — Thomas | Horstemeyer, LLP

(57) ABSTRACT

Various examples are provided related to fault detection of power converters. In one example, a method includes sensing phase currents of a three-phase transformer; determining a centroid vector in an alpha-beta stationary reference frame based upon averaged values of the sensed phase currents; identifying a fault on a side of the transformer based upon a location of the centroid vector within the alpha-beta stationary reference frame, the location defined by a magnitude and an angle of the centroid vector; and adjusting operation of the power converter in response to the identified fault. In another example, a power converter includes a three-phase transformer connected between primary and secondary side three-phase bridges and control circuitry that can determine a centroid vector based upon sensed phase currents; identify a fault on a side of the three-phase transformer; and adjust operation of the power converter in response to the identified fault.

19 Claims, 8 Drawing Sheets

(56)             References Cited

U.S. PATENT DOCUMENTS

2021/0281182 A1\*   9/2021   Kim ...................... G01R 19/02
2022/0115958 A1     4/2022   Rastogi et al.

OTHER PUBLICATIONS

H. Wen, J. Li, H. Shi, Y. Hu, and Y. Yang, "Fault Diagnosis and Tolerant Control of Dual-Active-Bridge Converter with Triple-Phase-Shift Control for Bidirectional EV Charging Systems," IEEE Transactions on Transportation Electrification, pp. 1-1, Dec. 2020.
N. Zhao, J. Liu, Y. Shi, J. Yang, J. Zhang, and X. You, "Mode analysis and fault-tolerant method of open circuit fault for a dual active-bridge dc-dc converter," IEEE Transactions on Industrial Electronics, vol. 67, No. 8, pp. 6916-6926, Aug. 2020.
M. Berger, I. Kocar, H. Fortin-Blanchette, and C. Lavertu, "Open-phase fault-tolerant operation of the three-phase dual active bridge converter," IEEE Transactions on Power Electronics, vol. 35, No. 4, pp. 3651-3662, Apr. 2020.
S. Haghbin, F. Blaabjerg, and A. S. Bahman, "Frozen leg operation of a three-phase dual active bridge converter," IEEE Transactions on Power Electronics, vol. 34, No. 5, pp. 4239-4248, May 2019.
A. Davoodi, D. Sadeghpour, M. Kashif, S. A. Albahrani, S. M. Atarodi, and M. Zolghadri, "A Novel Transistor Open-Circuit Fault Localization Scheme for Three-Phase Dual Active Bridge," 2018 Australasian Universities Power Engineering Conference (AUPEC), pp. 1-6, Nov. 2018.
S. K. Rastogi, S. S. Shah, B. N. Singh, and S. Bhattacharya, "Mode Analysis and Identification Scheme of Open-Circuit Fault in a Three-phase DAB Converter," IEEE Energy Conversion Congress and Exposition (ECCE), Oct. 2021.
L. F. Costa and M. Liserre, "Failure Analysis of the dc-dc Converter: A Comprehensive Survey of Faults and Solutions for Improving Reliability,"IEEE Power Electronics Magazine, vol. 5, No. 4, Dec. 2018.
S. K. Rastogi, S. S. Shah, B. N. Singh and S. Bhattacharya, "Vector-based Open-circuit Fault Diagnosis Technique for a Three-phase DAB Converter," in IEEE Transactions on Industrial Electronics. Jan. 2023.
S. K. Rastogi, S. and S. Shah, B. N. Singh., "Mode Analysis, transformer saturation, and fault diagnosis technique for an open-circuit fault in a three-phase DAB Converter", IEEE Transactions on Power Electronics, vol. 38, No. 6, Jun. 2023.
S. K. Rastogi, S. S. Shah, B. N. Singh, and S. Bhattacharya, "Vector-Based Open-Circuit Fault Diagnosis Technique for a Three-Phase DAB Converter," in IEEE Transactions on Industrial Electronics, doi: 10.1109/TIE.2023.3312430. Jan. 2023.

\* cited by examiner

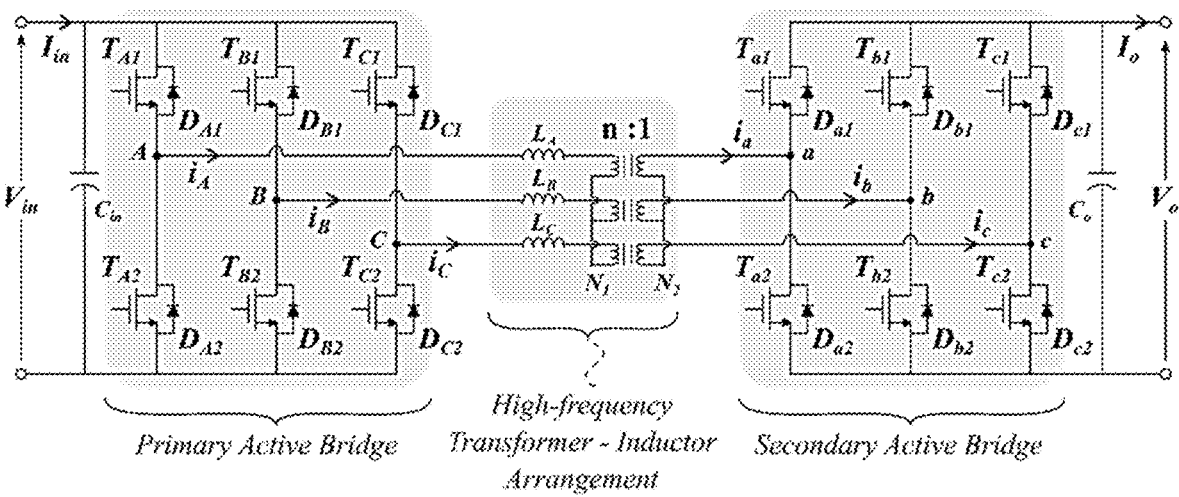

High-frequency
Transformer - Inductor
Arrangement

Primary Active Bridge          Secondary Active Bridge

FIG. 1

$i_A$ ⟶ Low-pass Filter ⟶ $\langle i_A \rangle$
$i_B$ ⟶ ⟶ $\langle i_B \rangle$
$i_C$ ⟶ ⟶ $\langle i_C \rangle$ $$\vec{G} = \langle i_A \rangle + \langle i_B \rangle \angle 120° + \langle i_C \rangle \angle 240°$$

$$= \langle i_A \rangle + \langle i_B \rangle \cdot e^{\frac{2\pi}{3}i} + \langle i_C \rangle \cdot e^{-\frac{2\pi}{3}i}$$

$$G_\alpha = \langle i_A \rangle \cos(0) + \langle i_B \rangle \cos(\tfrac{2\pi}{3}) + \langle i_C \rangle \cos(-\tfrac{2\pi}{3})$$

$$= \langle i_A \rangle - \tfrac{1}{2}\langle i_B \rangle - \tfrac{1}{2}\langle i_C \rangle$$

$$G_\beta = \langle i_A \rangle \sin(0) + \langle i_B \rangle \sin(\tfrac{2\pi}{3}) + \langle i_C \rangle \sin(-\tfrac{2\pi}{3})$$

$$= \tfrac{\sqrt{3}}{2}\langle i_B \rangle - \tfrac{\sqrt{3}}{2}\langle i_C \rangle$$

$$|\vec{G}| = \sqrt{G_\alpha{}^2 + G_\beta{}^2} \qquad \angle\vec{G} = tan^{-1}(\tfrac{G_\beta}{G_\alpha})$$

FIG. 2A

Normal mode - Phase currents

Primary fault ($T_{A1}$) - Phase currents

Primary fault ($T_{A1}$) - Detection and identification

Primary fault ($T_{A1}$)
Current signature centroid tracking $r_p = 1\ pu$
$r_S = 0.1\ pu$ $T_{A1}$ $T_{A1}$ Fault
mode signature Normal
mode signature Secondary fault ($T_{a1}$) - Phase currents — Phase-A current ($i_A$)  — Phase-C current ($i_C$)
— Phase-B current ($i_B$)  — Fault signal Time: 10 μs/div

| Ch1: 5A | Ch3: 5A | — Mean: 0.90A | — Mean: -0.4A |
| Ch2: 5A | Ch4: 5V | — Mean: -0.5A | (of last 1 div.) |

Secondary fault ($T_{a1}$) - Detection and identification

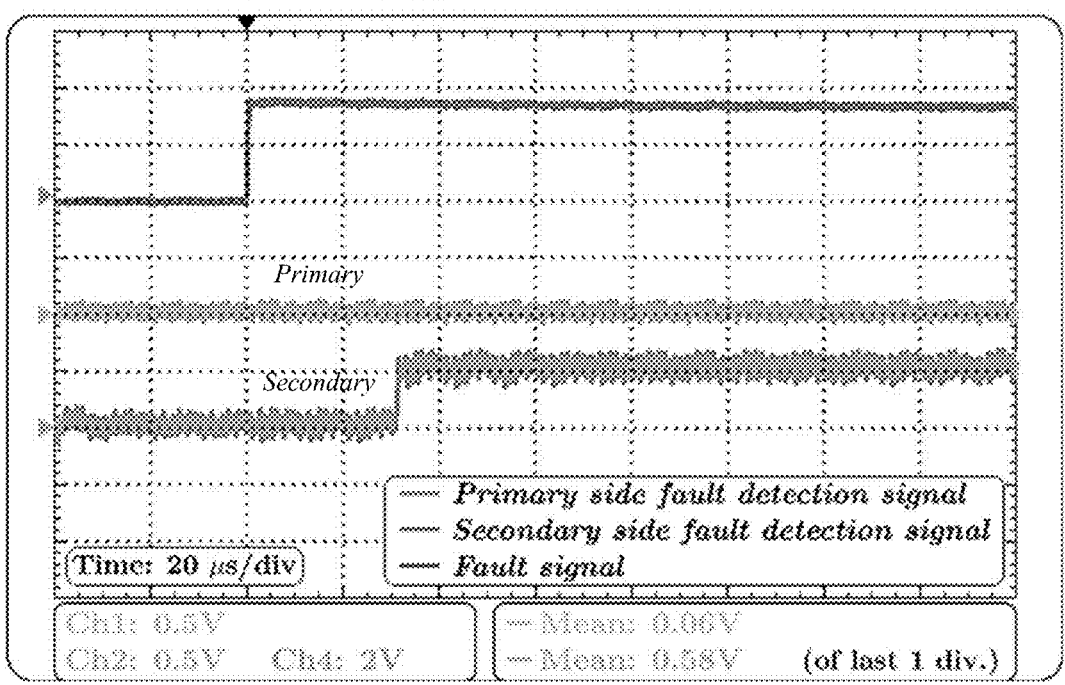

Primary

Secondary

Primary side fault detection signal
Secondary side fault detection signal
Fault signal Time: 20 μs/div Ch1: 0.5V
Ch2: 0.5V    Ch4: 2V — Mean: 0.00V
— Mean: 0.56V    (of last 1 div.)

FIG. 6B

Secondary fault ($T_{a1}$)
Current signature centroid tracking

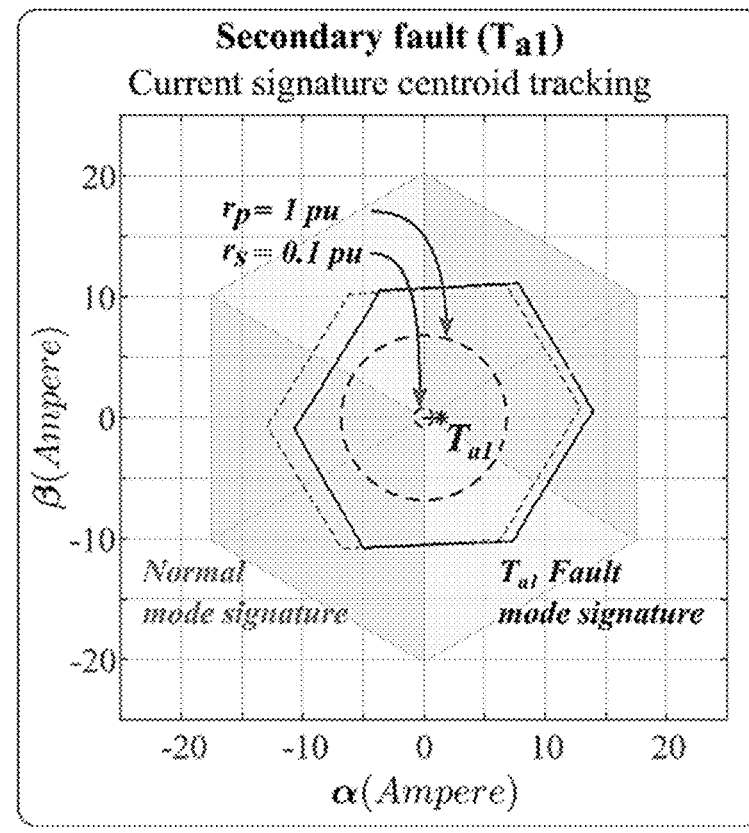

$r_p = 1$ pu
$r_s = 0.1$ pu $T_{a1}$

Normal
mode signature $T_{a1}$ Fault
mode signature $\beta$(Ampere)

$\alpha$(Ampere)

FIG. 6C

Primary fault ($T_{A1}$) - Magnetization currents

Secondary fault ($T_{a1}$) - Magnetization currents

REAL-TIME VECTOR-BASED OPEN-CIRCUIT FAULT DIAGNOSIS SCHEME FOR THREE-PHASE DUAL ACTIVE BRIDGE CONVERTER

CROSS REFERENCE TO RELATED APPLICATIONS

This application claims priority to, and the benefit of, U.S. provisional application entitled "Real-Time Vector Based Open-Circuit Fault Diagnosis Scheme for Three-Phase Dual Active Bridge Converter" having Ser. No. 63/430,161, filed Dec. 5, 2022, which is hereby incorporated by reference in its entirety.

STATEMENT REGARDING FEDERALLY SPONSORED RESEARCH OR DEVELOPMENT

This invention was made with government support under grant number DE-AC05-00OR22725 awarded by the U.S. Department of Energy. The government has certain rights in the invention.

BACKGROUND

The dual active bridge (DAB) converter is a popular electronic system that uses high frequency switching to transfer power from one DC port to a second DC port. It provides benefits in terms of efficiency, power density, and isolated bidirectional power transfer. It comprises a high-frequency transformer and operates with soft switching (zero voltage switching). Its three-phase variant, referred to as three-phase DAB (3p-DAB), is prevalent in many applications such as:

Solid-state transformers.
Datacenter and server power supplies.
Telecom power supplies such as those for cell towers and other telecom applications.
Automotive auxiliary power supplies.
On-board EV chargers and off-board superchargers.
Consumer electronics power supplies.
DC microgrid applications in rural communities, offshore oil and gas, military installations.

SUMMARY

Aspects of the present disclosure are related to fault detection of power converters. In one aspect, among others, a method for fault diagnosis comprises sensing phase currents on a single side of a three-phase transformer of a power converter; determining a centroid vector in an alpha-beta stationary reference frame based upon averaged values of the sensed phase currents; identifying a fault on a primary side or a secondary side of the three-phase transformer based upon a location of the centroid vector within the alpha-beta stationary reference frame, the location defined by a magnitude and an angle of the centroid vector; and adjusting operation of the power converter in response to the identified fault. In one or more aspects, the phase currents can be sensed on only one side of the three-phase transformer. The phase currents can be sensed on only a low current side of the three-phase transformer. The sensed phase currents can be filtered to generate averaged values. The fault can be identified within 3 or 4 switching cycles of the power converter.

In various aspects, the alpha-beta stationary reference frame can be divided into a plurality of regions, each region associated with a no-fault condition or a fault in a corresponding primary side switching device or a corresponding secondary side switching device. The plurality of regions can comprise a central region associated with the no-fault condition, 6 regions each associated with one of the primary side switching devices and 6 regions each associated with one of the secondary side switching devices. The alpha-beta stationary reference frame can be divided into six 60-degree sectors, each 60-degree sector comprising a first region associated with one of the primary side switching devices and a second region associated with one of the secondary side switching devices. The first region and the second region can be separated based upon a defined magnitude of the centroid vector.

In another embodiment, a power converter comprises a three-phase transformer connected between a primary side three-phase bridge and a secondary side three-phase bridge; and control circuitry configured to determine a centroid vector in an alpha-beta stationary reference frame based upon averaged values of phase currents sensed on a side of the three-phase transformer; identify a fault on a primary side or a secondary side of the three-phase transformer based upon a location of the centroid vector within the alpha-beta stationary reference frame, the location defined by a magnitude and an angle of the centroid vector; and adjust operation of the power converter in response to the identified fault. In one or more aspects, the phase currents can be sensed on a single side of the three-phase transformer. The phase currents can be sensed on only a low current side of the three-phase transformer. The power converter can comprise current sensors on the low current side of the three-phase transformer without having current sensors on the high current side of the three-phase transformer.

In various aspects, the alpha-beta stationary reference frame can be divided into a plurality of regions, each region associated with a no-fault condition or a fault in a corresponding primary side switching device or a corresponding secondary side switching device. The plurality of regions can comprise a central region associated with the no-fault condition, 6 regions each associated with one of the primary side switching devices and 6 regions each associated with one of the secondary side switching devices. The alpha-beta stationary reference frame can be divided into six 60-degree sectors, each 60-degree sector comprising a first region associated with one of the primary side switching devices and a second region associated with one of the secondary side switching devices. The first region and the second region can be separated based upon a defined magnitude of the centroid vector. The sensed phase currents can be filtered to generate averaged values. The fault can be identified within 3 or 4 switching cycles of the power converter.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 illustrates an example of a three-phase dual active bridge (3p-DAB) converter, in accordance with various embodiments of the present disclosure.

FIGS. 2A-2C illustrate an example of filtering of the phase currents and vector based fault diagnosis, in accordance with various embodiments of the present disclosure.

FIGS. 5A-5C, 6A-6C and 7A-7B illustrate examples of experimental verification results of the proposed fault-diagnosis scheme when a 3p-DAB is subjected to primary side and secondary side faults, in accordance with various embodiments of the present disclosure.

DETAILED DESCRIPTION

Figure 2B:
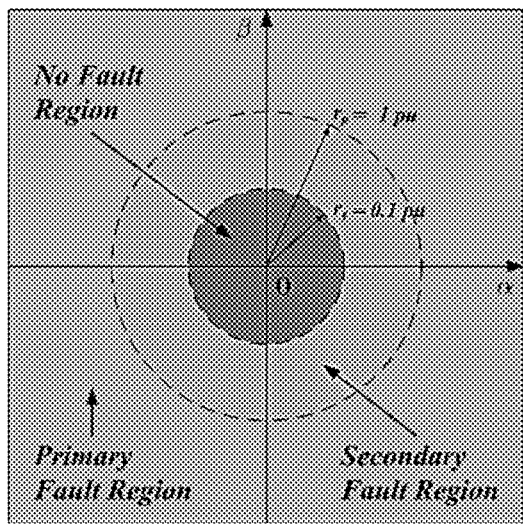

Disclosed herein are examples related to fault detection of three-phase dual active bridge (DAB) converters. Reference will now be made in detail to the description of the embodiments as illustrated in the drawings, wherein like reference numbers indicate like parts throughout the several views.

The 3p-DAB has twelve semiconductor devices. Any failure in the gate-drive circuitry or a failure of the device itself can prevent the device from switching and lead to an open-circuit fault. An open-circuit fault at any of the twelve locations produces DC biases in the phase currents. This can lead to increased losses in the semiconductor devices and can cause the magnetics (the transformer and the inductor) of the circuit to saturate. This can also result in catastrophic failure of the power electronic system. In this disclosure, a real-time vector-based fault diagnosis scheme to detect and identify the location of the fault is presented. Faults on either side of the transformer can be detected by sensing the AC phase currents on only one side of the transformer. The diagnosis scheme provides a high margin for noise immunity and system non-idealities. Moreover, the scheme uses the average value of the phase currents, which allows the scheme to be implemented using low bandwidth current sensors.

FIG. 1 illustrates an example of a 3p-DAB comprising twelve semiconductor devices. The high number of devices means an increased risk of failure. Any failure in the gate-drive circuitry or a failure of the device itself can prevent the device from switching and lead to an open-circuit fault. An open-circuit fault at any of the twelve locations produces DC biases in the phase currents. This can lead to increased losses in the semiconductor devices and can cause the magnetics of the circuit to saturate. This can also result in catastrophic failure of the power electronic system.

The disclosed methodology can improve the reliability of the power electronics system by providing a real-time fault diagnosis scheme to detect and identify the location of a fault, such that corrective action can be taken before any magnetic saturation (in either the transformer or the inductor) or catastrophic failure of the system occurs. The scheme does not require any circuit modification and utilizes current sensing on only one side of the transformer to detect a fault on either side. This allows for the use of lower-rated current sensors placed on the low current side of the high-gain converters, which can reduce the system cost. Moreover, the detection scheme relies only on the DC bias value of the phase currents, implying that the proposed scheme can be implemented using low bandwidth current sensors.

The proposed scheme uses the centroid vector of the phase currents' waveform signature in an alpha-beta stationary reference frame, which enables the detection and identification of the fault much before the risk of saturation occurs. A vector-based fault identification scheme, which detects the primary and secondary side faults independently, can be used. Moreover, a 60 degree sector-based approach provides a large margin for noise immunity and system non-idealities.

TECHNICAL DESCRIPTION

The control architecture of the resonant power converters can comprise the following features:

The three-phase currents ($i_A$, $i_B$, $i_C$) are sensed on one side of the transformer (e.g., the low current side) and the measurements are passed through a low pass filter to obtain their average value ($\langle i_A \rangle$, $\langle i_B \rangle$, $\langle i_C \rangle$). FIG. 2A illustrates an example of the filtering of the phase currents.

A centroid vector ($\vec{G}$) can then be calculated in real-time using the following relationship:

$$\vec{G} = \langle i_A \rangle + \langle i_B \rangle \angle 120° + \langle i_C \rangle \angle 240° = \langle i_A \rangle + \langle i_B \rangle \cdot e^{\frac{2\pi}{3}i} + \langle i_C \rangle \cdot e^{-\frac{2\pi}{3}i}$$

FIG. 2A illustrates the calculation of the centroid vector (magnitude and phase) from the average values of the currents.

Figure 4A:
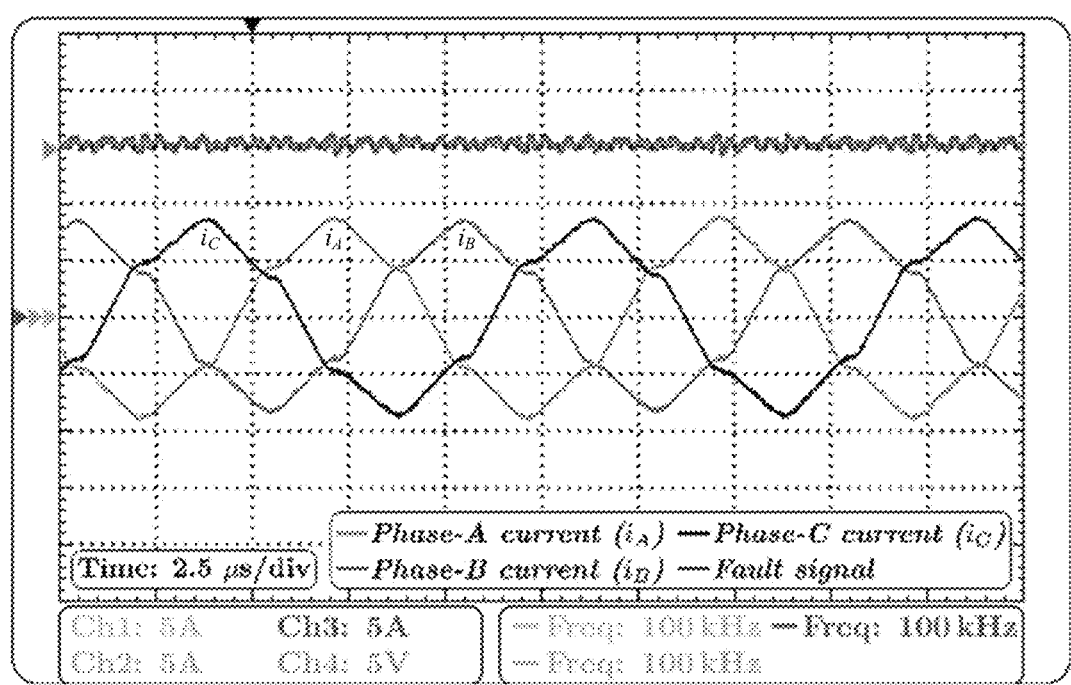
FIGS. 4A and 4B illustrate an example of the phase currents and a centroid vector in the alpha-beta frame during normal mode (no fault) operation of the 3p-DAB, in accordance with various embodiments of the present disclosure.
Figure 4B:
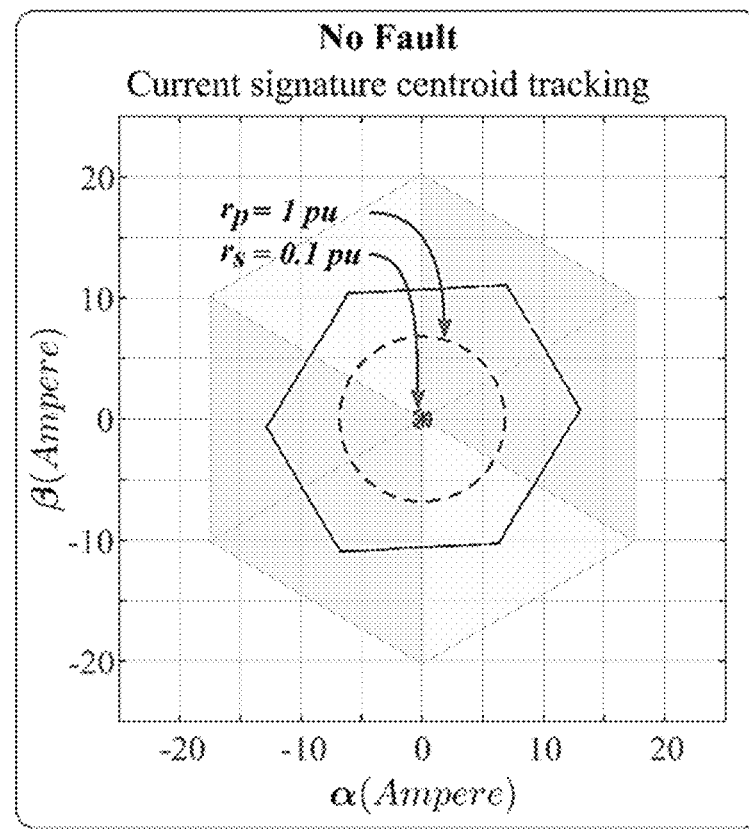

The magnitude of the centroid vector $\vec{G}(|\vec{G}|)$ is zero under normal mode operation (see FIG. 4B). If $|\vec{G}|$ rises above 10% of the input DC current ($I_{in}$) or 0.1 pu, then a fault is detected.

If $|\vec{G}|$ rises above 100% of $I_{in}$ or 1 pu, then the fault is identified to be on the primary side bridge as shown in FIG. 2B. If $|\vec{G}|$ rises above 10% of $I_{in}$ and remains below 100% of $I_{in}$, then the fault is identified to be on the secondary side bridge as shown in FIG. 2B.

Figure 2C:
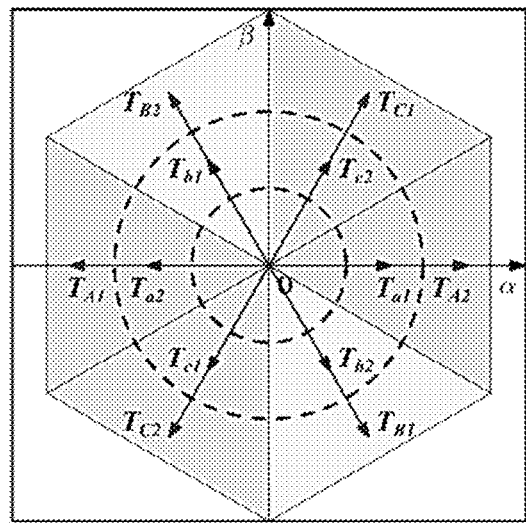

The location of a faulty switching device (transistor) within the bridge can be identified based on the angle of $\vec{G}(\angle\vec{G})$. The proposed scheme is summarized in Table 1 below and graphically represented in FIG. 2C. Vectors $T_{A1}$, $T_{A2}$, $T_{B1}$, $T_{B2}$, $T_{C1}$ and $T_{C2}$ indicate the six primary side fault cases, and the vectors $T_{a1}$, $T_{a2}$, $T_{b1}$, $T_{b2}$, $T_{c1}$ and $T_{c2}$ indicate the six secondary side fault cases. Each fault case has a 60° sector which provides increased noise-immunity.

TABLE 1

Centroid vector of phase currents ($\vec{G}$) based
open-circuit fault identification scheme for 3p-DAB

| No Fault | Primary Side Fault $1\,pu \le |\vec{G}|$ | | Secondary Side Fault $0.1\,pu \le |\vec{G}| < 1\,pu$ | |
| --- | --- | --- | --- | --- |
| | Faulty Transistor | Sector | Faulty Transistor | Sector |
| $|G| < 0.1\,pu$ | $T_{A1}$ | $150° \le \angle\vec{G} < 210°$ | $T_{a1}$ | $330° \le \angle\vec{G} < 30°$ |
| $0° \le \angle G < 360°$ | $T_{A2}$ | $330° \le \angle\vec{G} < 30°$ | $T_{a2}$ | $150° \le \angle\vec{G} < 210°$ |
| | $T_{B1}$ | $270° \le \angle\vec{G} < 330°$ | $T_{b1}$ | $90° \le \angle\vec{G} < 150°$ |
| | $T_{B2}$ | $90° \le \angle\vec{G} < 150°$ | $T_{b2}$ | $270° \le \angle\vec{G} < 330°$ |
| | $T_{C1}$ | $30° \le \angle\vec{G} < 90°$ | $T_{c1}$ | $210° \le \angle\vec{G} < 270°$ |
| | $T_{C2}$ | $210° \le \angle\vec{G} < 270°$ | $T_{c2}$ | $30° \le \angle\vec{G} < 90°$ |

The diagnosis pattern is symmetric for the reverse power flow of the converter. Only the primary and secondary side bridges are swapped, and no additional changes are needed in the algorithm.

The specific numeric values presented here are for the star-star transformer connection in 3p-DAB. However, it can also be extended for star-delta and delta-delta variations of DAB3.

Figure 3:
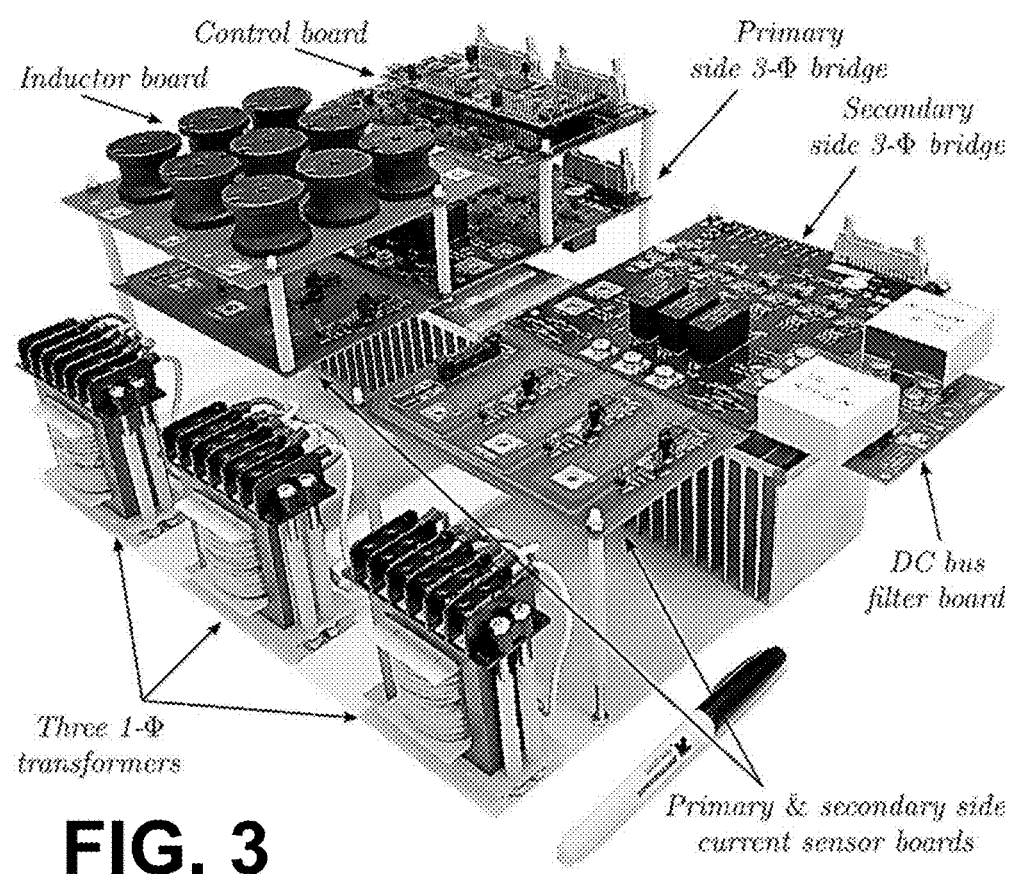
FIG. 3 is an image of the experimental hardware prototype of a 3p-DAB, in accordance with various embodiments of the present disclosure.

The proposed fault diagnosis scheme was implemented and verified on a hardware prototype. FIG. 3 is an image of the experimental hardware prototype of the implemented 3p-DAB. FIG. 4A shows an example of the phase currents in the time domain during normal mode (no fault) operation. As shown in FIG. 4B, centroid vector of the phase currents in the alpha-beta frame is centered (zero magnitude).

Figure 5A:
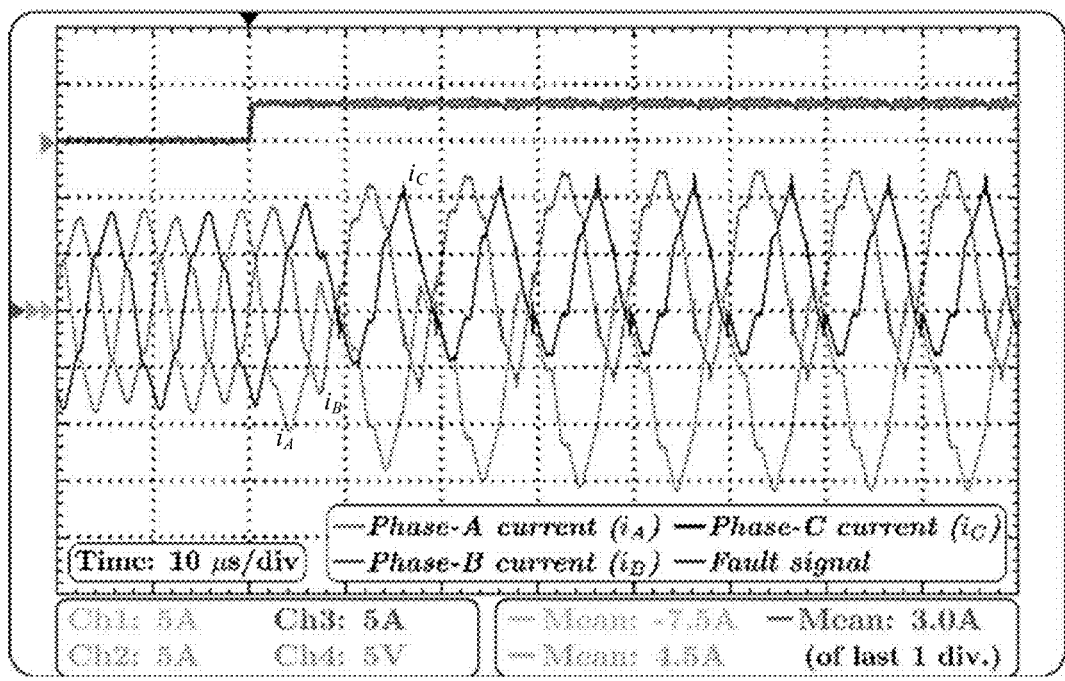
Figure 5B:
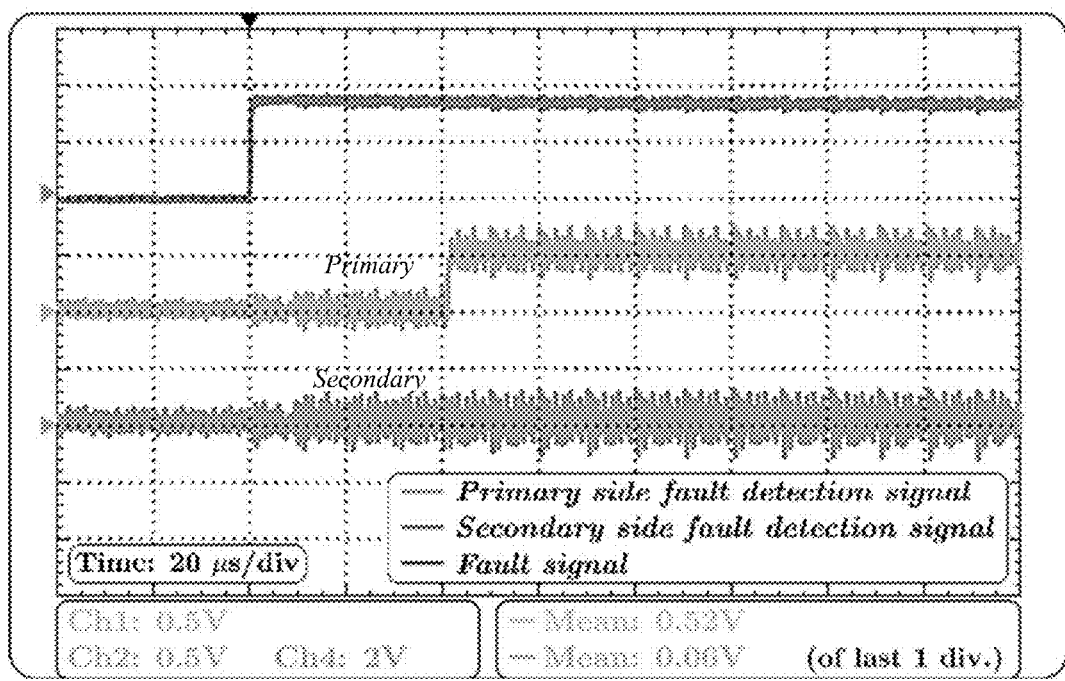
Figure 5C:
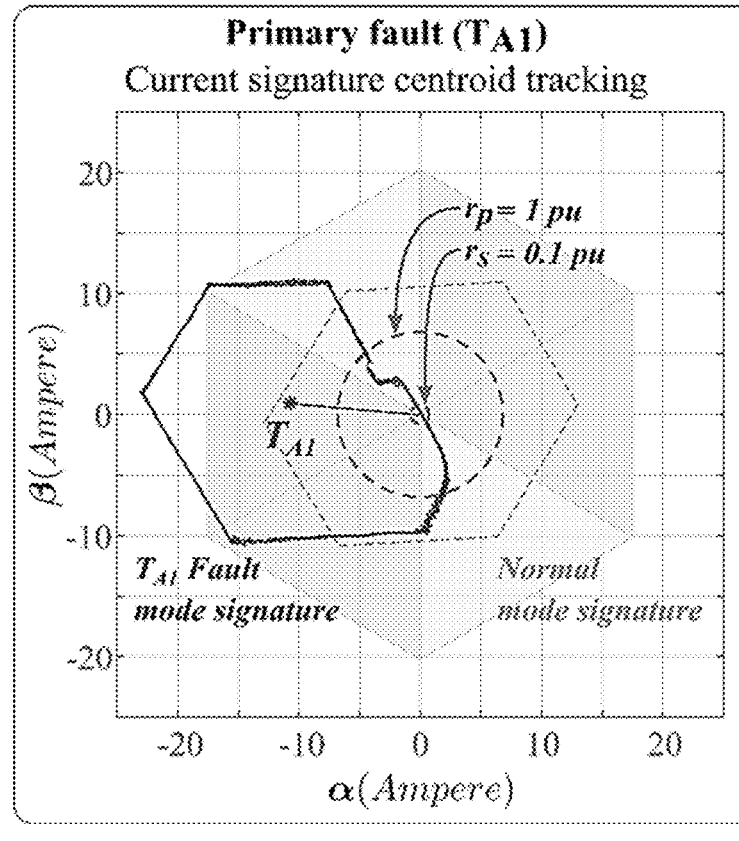

FIGS. 5A-5C, 6A-6C and 7A-7B illustrate examples of experimental verification results of the proposed scheme when a 3p-DAB is subjected to primary side fault at $T_{A1}$ and secondary side fault at $T_{a1}$, respectively. FIG. 5A shows an example of phase currents under a primary side fault at $T_{A1}$ experienced during the experimental verification of the proposed fault diagnosis scheme. The DC bias in the phase currents is clearly visible after the fault trigger. FIG. 5B shows that primary and secondary fault detection signals were observed using DAC signals from the micro-controller. The 3 V DAC output range was divided into six steps of 0.5 V to identify the faulty transistor. Voltages of 0.5 V, 1 V, 1.5 V, 2 V, 2.5 V, 3 V represent $T_{A1}$, $T_{A2}$, $T_{B1}$, $T_{B2}$, $T_{C1}$, $T_{C2}$, respectively. Similar division was done for the secondary side detection signal. The proposed fault diagnosis scheme successfully detected the fault and identified the faulty transistor within 4 switching cycles. FIG. 5C illustrates that the centroid vector's magnitude and phase can be observed. $|\vec{G}|$ rises above 100% of $I_{in}$ indicating that the fault is on the primary side, and $150°<\angle\vec{G}<210°$ identifies the location of the fault as $T_{A1}$ transistor.

Figure 6A:
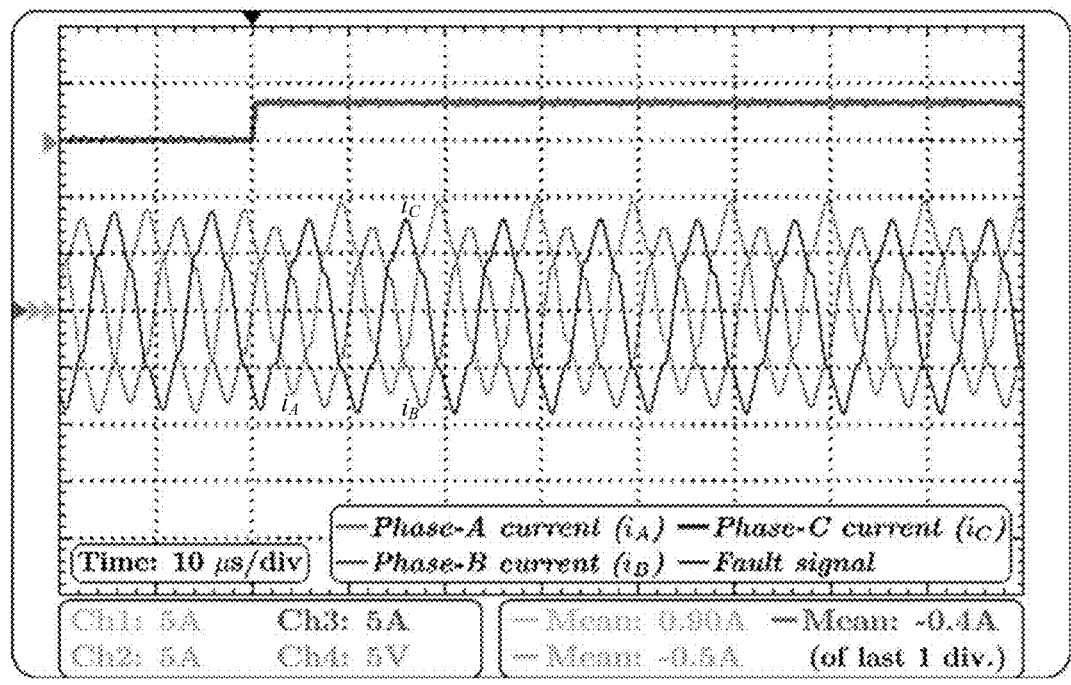

FIG. 6A shows an example of phase currents under a secondary side fault at $T_{a1}$ experienced during the experimental verification of the proposed fault diagnosis scheme. The DC bias in phase currents is clearly visible after the fault trigger. FIG. 6B shows that primary and secondary fault detection signals were observed using DAC signals from the micro-controller. The 3 V DAC output range was divided into six steps of 0.5 V to identify the faulty transistor. Voltages of 0.5 V, 1 V, 1.5 V, 2 V, 2.5 V, 3 V represent $T_{A1}$, $T_{A2}$, $T_{B1}$, $T_{B2}$, $T_{C1}$, $T_{C2}$, respectively. Similar division was done for the secondary side detection signal. The proposed fault diagnosis scheme successfully detected the fault and identified the faulty transistor within 3 switching cycles. FIG. 5C illustrates that the centroid vector's magnitude and phase are observed. $|\vec{G}|$ settles between 10% and 100% of $I_{in}$, indicating that the fault is on the secondary side, and $330°<\angle\vec{G}<30°$ identifies the location of the fault as $T_{a1}$ transistor.

Figure 7A:
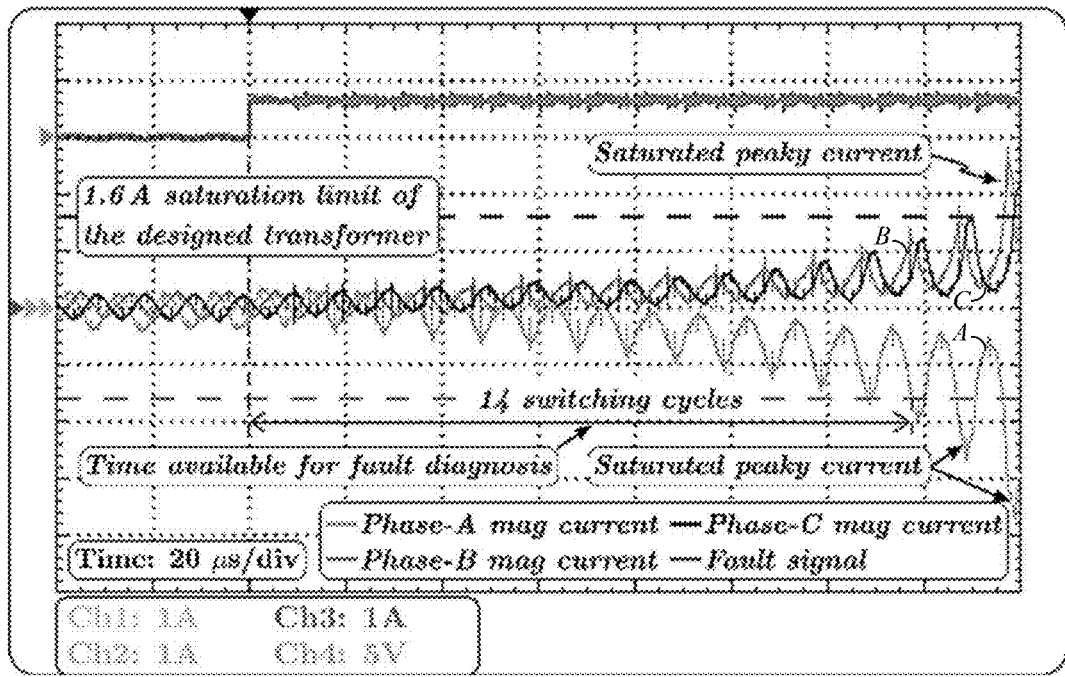
Figure 7B:
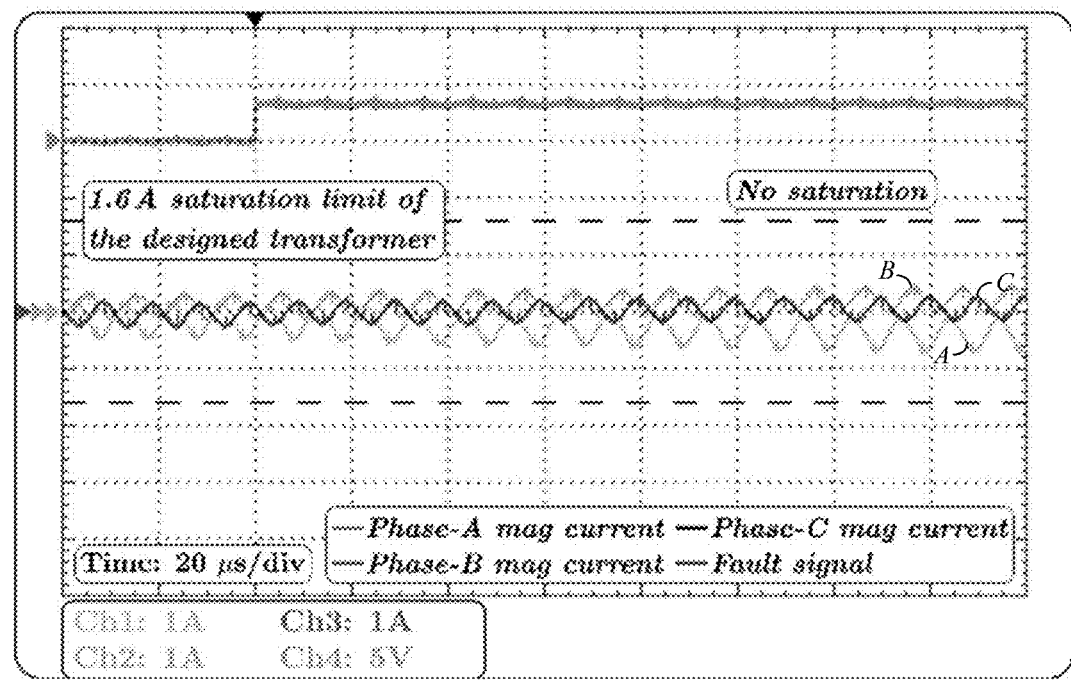

The risk of magnetic saturation was verified in the experiments. FIGS. 7A and 7B illustrate examples of the magnetizing current of the transformer under the primary and secondary side fault conditions, respectively. The experimental results show that if the fault is not detected in time, then the magnetizing current will keep increasing and saturate the transformer. The proposed fault diagnosis scheme can avoid this situation.

The disclosed scheme utilizes current sensing on only one side of the transformer to detect the faults on either side (both the primary and secondary sides). This provides a cost and design benefit, especially in high-power and high-gain converters. The high-current and high-frequency sensors are costly compared to the low-current and high-frequency sensors. In the high-power/high-gain converters, the current sensors can be placed on just the low-current side, and the detection scheme can identify the faults on both sides of the transformer. In addition, the proposed diagnosis scheme is based on the average value (DC bias) of the phase currents and not the exact waveshape of the currents. This can allow the cost of the sensors to be further reduced by using low current and low bandwidth sensors.

The disclosed diagnosis scheme is based on the centroid vector of the phase currents in the alpha-beta stationary reference frame, unlike the logic-based approaches. The fault identification on the primary and secondary sides is independent of each other. Therefore, the fault identification for both sides can happen simultaneously, resulting in more responsiveness than logic-based approaches, where the secondary side fault identification depends on the primary side fault identification. The proposed diagnosis scheme does not need the magnetizing current information of the transformer to detect and identify the fault. This allows the fault to be diagnosed before the risk of saturation. The disclosed vector-based approach divides the 360 degrees vector space into 60 degrees sectors for each of the twelve fault conditions. This results in high noise immunity and reliable fault diagnosis, where the logic-based identification can be sensitive to the threshold values. The diagnosis pattern is symmetric for the reverse power flow of the converter. Only the primary and secondary side bridges are swapped, and no additional changes are needed in the algorithm.

The proposed approach is system-based and can be implemented by only observing the phase currents. Therefore, in DAB circuits, where current sensing for control purposes is a norm, the proposed diagnosis scheme can be deployed as a software update on existing hardware with no additional circuit/hardware modification. Since the proposed method uses phase currents to diagnose the fault, it is more robust than a device-level fault diagnosis using an intelligent gate driver. If an intelligent gate driver method is used to diagnose the fault, then a failure of the device can fail the gate driver itself, leaving the fault undetected and unidentifiable. Since detection and identification of faulty transistors is important for implementing any post-detection fault-tolerant scheme, the proposed diagnosis scheme can form the basis of any such scheme. The simple current measurement-based fault diagnosis scheme with vector analysis can be modified for other dual active bridge-based converters.

Figure 8:
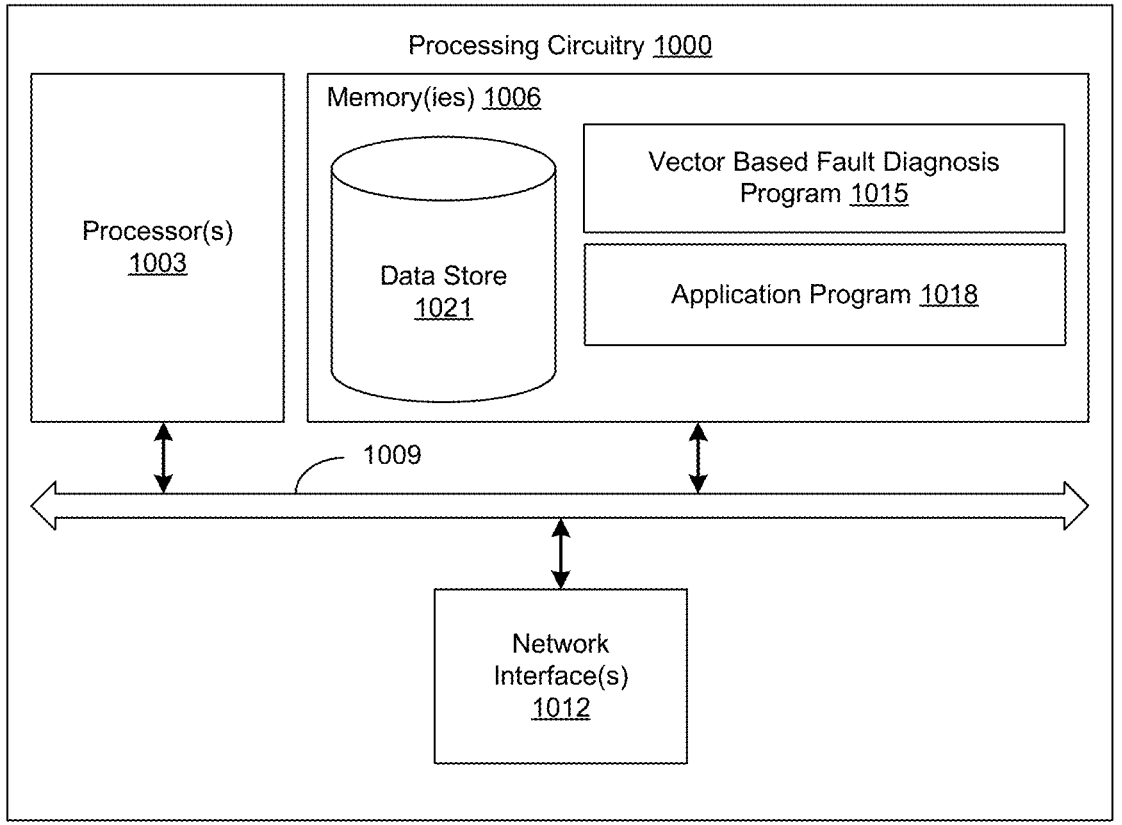
FIG. 8 is a schematic diagram illustrating an example of processing circuitry that can be used for implementing a fault diagnosis scheme, in accordance with various embodiments of the present disclosure.

FIG. 8 is a schematic diagram illustrating an example of processing circuitry 1000 that can be used for the disclosed fault diagnosis scheme, in accordance with various embodiments of the present disclosure. The processing circuitry 1000 can comprise one or more computing/processing device such as, e.g., a computer, controller, smartphone, tablet, etc. The processing circuitry 1000 can include at least one processor circuit (e.g., a microcontroller circuit), for example, having a processor 1003 and a memory 1006, both of which are coupled to a local interface 1009. To this end, each processing circuitry 1000 may comprise, for example, at least one server computer or like device, which can be utilized in a cloud based environment. The local interface 1009 may comprise, for example, a data bus with an accompanying address/control bus or other bus structure as can be appreciated.

In some embodiments, the processing circuitry 1000 can include one or more network interfaces 1012. The network interface 1012 may comprise, for example, a wireless transmitter, a wireless transceiver, and/or a wireless receiver. The network interface 1012 can communicate to a remote computing/processing device or other components using a Bluetooth, WiFi, or other appropriate wireless protocol. As one skilled in the art can appreciate, other wireless protocols may be used in the various embodiments of the present disclosure. The network interface 1012 can also be configured for communications through wired connections.

Stored in the memory 1006 are both data and several components that are executable by the processor(s) 1003. In particular, stored in the memory 1006 and executable by the processor 1003 can be a vector based fault diagnosis application 1015 which can provide real-time fault diagnosis to detect and identify the location of a fault in a power electronics system as disclosed herein, and potentially other applications 1018. In this respect, the term "executable" means a program file that is in a form that can ultimately be run by the processor(s) 1003. Also stored in the memory 1006 may be a data store 1021 and other data. In addition, an operating system may be stored in the memory 1006 and executable by the processor(s) 1003. It is understood that there may be other applications that are stored in the memory 1006 and are executable by the processor(s) 1003 as can be appreciated.

Examples of executable programs may be, for example, a compiled program that can be translated into machine code in a format that can be loaded into a random access portion of the memory 1006 and run by the processor(s) 1003, source code that may be expressed in proper format such as object code that is capable of being loaded into a random access portion of the memory 1006 and executed by the processor(s) 1003, or source code that may be interpreted by another executable program to generate instructions in a random access portion of the memory 1006 to be executed by the processor(s) 1003, etc. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and/or multiple processor cores, and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, ultrasound or other devices. The processor 1003 may be of electrical or of some other available construction.

Although the vector based fault diagnosis application 1015, and other various applications 1018 described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the vector based fault diagnosis application 1015, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the vector based fault diagnosis application 1015, may be implemented and structured in a variety of ways. For example, one or more applications described may be implemented as modules or components of a single application. For example, the vector based fault diagnosis application 1015 can include a wide range of modules such as, e.g., an initial model or other modules that can provide specific functionality for the disclosed methodology. Further, one or more applications described herein may be executed in shared or separate computing/processing devices or a combination thereof. For example, a plurality of the applications described herein may execute in the same processing circuitry 1000, or in multiple computing/processing devices in the same computing environment. To this end, each processing circuitry 1000 may comprise, for example, at least one server computer or With more adoption of power electronic DC-DC converters, their reliability becomes increasingly important. The 3p-DAB is a popular DC-DC converter topology as it provides high efficiency, high power density, and bidirectional power transfer with galvanic isolation between its input/output terminals. The disclosed diagnosis scheme can provide engineers with more confidence while using 3p-DAB in products as it can detect and identify a fault before the risk of catastrophic failure and good noise immunity occurs. The proposed approach is system-based and can be implemented by only observing the phase currents on one side of the transformer. Therefore, it does not need any hardware circuit modification and can be programmed inside the microcontroller.

Since detection and identification of faulty transistors is important for implementing a post-detection fault-tolerant scheme, the proposed diagnosis scheme can form the basis of any such scheme. For example, the proposed scheme offers real-time fault location identification on primary and secondary sides of the transformer. Then, a fault-tolerant scheme such as those described in, e.g., "Open-phase fault-tolerant operation of the three-phase dual active bridge converter" by M. Berger et al. (*IEEE Transactions on Power Electronics*, vol. 35, no. 4, pp. 3651-3662, 2020) or "Frozen leg operation of a three-phase dual active bridge converter" by S. Haghbin et al. (*IEEE Transactions on Power Elec-*

10

*tronics*, vol. 34, no. 5, pp. 4239-4248, 2019) can be applied, allowing reduced power converter operation under fault conditions and reducing the downtime of a converter.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for fault diagnosis, comprising:
sensing phase currents on a single side of a three-phase transformer of a power converter;
determining a centroid vector in an alpha-beta stationary reference frame based upon averaged values of the sensed phase currents;
identifying a fault on a primary side or a secondary side of the three-phase transformer based upon a location of the centroid vector within the alpha-beta stationary reference frame, the location defined by a magnitude and an angle of the centroid vector; and
adjusting operation of the power converter in response to the identified fault.

2. The method of claim 1, wherein the alpha-beta stationary reference frame is divided into a plurality of regions, each region associated with a no-fault condition or a fault in a corresponding primary side switching device or a corresponding secondary side switching device.

3. The method of claim 2, wherein the plurality of regions comprises a central region associated with the no-fault condition, 6 regions each associated with one of the primary side switching devices and 6 regions each associated with one of the secondary side switching devices.

4. The method of claim 2, wherein the alpha-beta stationary reference frame is divided into six 60-degree sectors, each 60-degree sector comprising a first region associated with one of the primary side switching devices and a second region associated with one of the secondary side switching devices.

5. The method of claim 4, wherein the first region and the second region are separated based upon a defined magnitude of the centroid vector.

6. The method of claim 1, wherein the phase currents are sensed on only one side of the three-phase transformer.

7. The method of claim 1, wherein the phase currents are sensed on only a low current side of the three-phase transformer.

8. The method of claim 1, wherein the sensed phase currents are filtered to generate averaged values.

9. The method of claim 1, wherein the fault is identified within 3 or 4 switching cycles of the power converter.

10. A power converter, comprising:

a three-phase transformer connected between a primary side three-phase bridge and a secondary side three-phase bridge; and control circuitry configured to:

determine a centroid vector in an alpha-beta stationary reference frame based upon averaged values of phase currents sensed on a side of the three-phase transformer;

identify a fault on a primary side or a secondary side of the three-phase transformer based upon a location of the centroid vector within the alpha-beta stationary reference frame, the location defined by a magnitude and an angle of the centroid vector; and adjust operation of the power converter in response to the identified fault.

11. The power converter of claim 10, wherein the alpha-beta stationary reference frame is divided into a plurality of regions, each region associated with a no-fault condition or a fault in a corresponding primary side switching device or a corresponding secondary side switching device.

12. The power converter of claim 11, wherein the plurality of regions comprises a central region associated with the no-fault condition, 6 regions each associated with one of the primary side switching devices and 6 regions each associated with one of the secondary side switching devices.

13. The power converter of claim 11, wherein the alpha-beta stationary reference frame is divided into six 60-degree sectors, each 60-degree sector comprising a first region associated with one of the primary side switching devices and a second region associated with one of the secondary side switching devices.

14. The power converter of claim 13, wherein the first region and the second region are separated based upon a defined magnitude of the centroid vector.

15. The power converter of claim 10, wherein the phase currents are sensed on a single side of the three-phase transformer.

16. The power converter of claim 15, wherein the phase currents are sensed on only a low current side of the three-phase transformer.

17. The power converter of claim 16, comprising current sensors on the low current side of the three-phase transformer without having current sensors on a high current side of the three-phase transformer.

18. The power converter of claim 10, wherein the sensed phase currents are filtered to generate averaged values.

19. The power converter of claim 10, wherein the fault is identified within 3 or 4 switching cycles of the power converter.

* * * * *